United States Patent
Yuan

(10) Patent No.: US 12,423,082 B2
(45) Date of Patent: Sep. 23, 2025

(54) METHOD FOR MANAGING STORAGE CONTROLLERS, ELECTRONIC DEVICE, AND COMPUTER READABLE STORAGE MEDIUM THEREOF

(71) Applicant: Fulian Precision Electronics (Tianjin) Co., LTD., Tianjin (CN)

(72) Inventor: Jie Yuan, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 251 days.

(21) Appl. No.: 18/196,425

(22) Filed: May 11, 2023

(65) Prior Publication Data

US 2024/0160430 A1     May 16, 2024

(30) Foreign Application Priority Data

Nov. 12, 2022    (CN) .......................... 202211416377.6

(51) Int. Cl.
G06F 8/65        (2018.01)
G06F 9/4401     (2018.01)

(52) U.S. Cl.
CPC .............. *G06F 8/65* (2013.01); *G06F 9/4401* (2013.01)

(58) Field of Classification Search
USPC ........................................................ 717/168
See application file for complete search history.

(56) References Cited

U.S. PATENT DOCUMENTS

| 2005/0197996 A1* | 9/2005 | Cobb ................. G06F 9/44536 |
| 2006/0112173 A1 | 5/2006 | Cohn et al. |
| 2016/0210057 A1* | 7/2016 | Khande ................. G06F 3/0632 |
| 2018/0018231 A1 | 1/2018 | Okada et al. |
| 2023/0359465 A1* | 11/2023 | Suryanarayana ..... G06F 9/4411 |

OTHER PUBLICATIONS

"Fstab"; Wikipedia.org website; Aug. 30, 2022 update (Year: 2022).*
"Remove automatic mount of external HDD"; Raspberry Pi blog at stackexchange.com [full URL included in ref.]; Sep. 21, 2018 (Year: 2018).*
Egidio Docile; "How to build an initramfs using Dracut on Linux"; linuxconfig.org website [full URL included in ref.]; Dec. 14, 2021 (Year: 2021).*
Daniel Petri; "Control USB Drive Letter Assignment in Windows XP/2003/Vista/2008"; Petri.com website [full URL included in ref.]; Jan. 6, 2009 (Year: 2009).*
Harry Skon; "VFS, proc and root filesystems"; Wordpress.com blogpage [full URL included in ref.]; Mar. 31, 2015 (Year: 2015).*

* cited by examiner

*Primary Examiner* — Yuqing Xiao
*Assistant Examiner* — Clint Thatcher
(74) *Attorney, Agent, or Firm* — ScienBiziP, P.C.

(57) ABSTRACT

A method for managing storage controllers of an electronic device comprises updates a driver configuration file of a data disk storage controller. A driver image file of a virtual file system is updated according to the driver configuration file. An operation system of the electronic device is rebooted. A driver of a system disk storage controller is started according to the driver image file while starting the virtual file system. A driver of the data disk storage controller is started while starting a root file system. A first driver letter is allocated to a system disk based on the updated drier image. An electronic device and a computer readable storage medium applying the method are also disclosed.

20 Claims, 5 Drawing Sheets

METHOD FOR MANAGING STORAGE CONTROLLERS, ELECTRONIC DEVICE, AND COMPUTER READABLE STORAGE MEDIUM THEREOF

FIELD

The subject matter herein generally relates to computer technology.

BACKGROUND

While starting an operation system of an electronic device, the drive letters are allocated for the storage mediums according to a scanning order. A driver of the system disk storage controller and a driver of the data disk storage controller are run multithreaded, which is difficult to determining a sequence of running the drivers. The driver of the data disk storage controller may run first, which cause the electronic device to scan the data disk and allocate a first drive letter to the data disk. However, to effectively distinguish the drive letters of the system disk and the drive letters of the data disk, the electronic device considers the first drive letter as the drive letter of the system disk. While operations of writing or erasing to the data disk, if the first drive letter is the drive letter of data disk, the operations of writing or erasing may be wrongly applied to the drive letter of the system disk, which scenario causes a data storage exception, even lead to damaging the operation system.

There is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
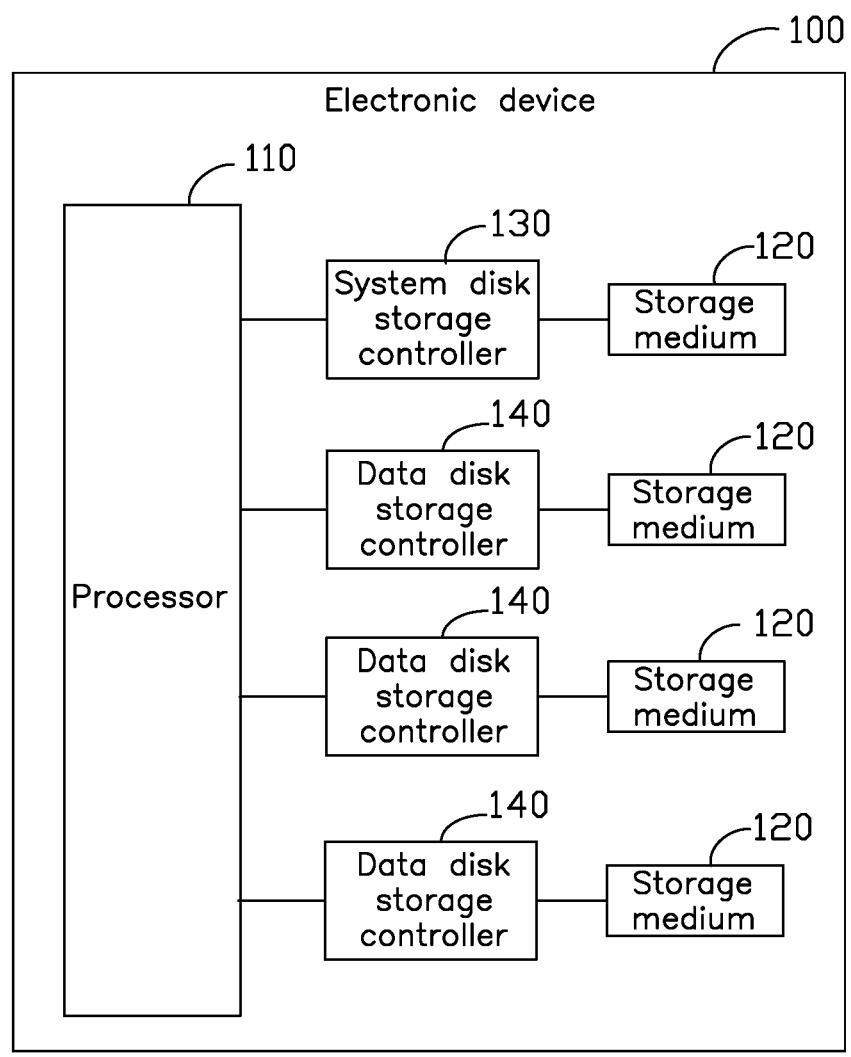
FIG. 1 is a diagram illustrating a first embodiment of an electronic device according to the present disclosure.

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Terms "first", "second", and the like used in the specification, the claims, and the accompanying drawings of the present disclosure are used to distinguish different objects rather than describe a particular order. A term "comprise" and its variations are intended to cover a non-exclusive inclusion. For example, a process, method, system, product, or apparatus including a series of steps or units is not limited to the listed steps or units, and may optionally include other steps or units that are not listed, or other steps or units inherent to the process, method, product, or device.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

Examples of some selected terms are provided as follows.
1. Storage Controller

The storage controller is a device for controlling an accessing of storage medium according to a specified timing rule, which includes the control of address signals, data signals, and other instruction signals, which enables the electronic device accessing a storage medium to use storage resources in the storage medium. A function of the storage controller provides an interface conversion, which converts commands sent by the electronic device, such as read or write, into signals being identified by the storage medium, and decodes an address and converts data format between the electronic device and the storage medium.

The storage controller may include host bus adapter (HBA), redundant array of independent disks (RAID), and the like, but not being limited.
2. Driver The driver is short for driver programs. The driver is a driver program in the storage controller and is specified program added into an operation system of the electronic device, which includes related information of electronic device. The related information may enable the electronic device to communicate with the corresponding storage controller, therefore the electronic device can access a corresponding storage medium through a storage controller.

3. Operation System (OS)

The operation system is a group of system software programs related with each other for managing and controlling computer operations, applying and running hardware and software, and providing public services for organizing user interaction. While the electronic device starts the OS, a virtual file system (for example, initramfs) is firstly started, and a driver of a system disk storage controller and a driver of a data disk storage controller are started while starting the virtual file system, and then a root file system is started. A function of the virtual file system is used for mounting root file system. An operation of mounting is a process for associating a file system with a storage medium. The root file system includes directories and important files, which are needed for starting the OS, and files, which are needed for mounting other file system.

4. System Disk and Data Disk

The electronic device divides storing space into system disk and data disk while partition storing. The system disk is configured to store information related to the operation system. The data disk is configured to store data besides the operation system, such as data transmitted between the electronic device and the storage medium.

5. Driver Configuration File

A driver configuration file includes information of install configuration for starting the driver of the storage controller, such as a type of the storage controller, information of a version of the storage controller.

6. Driver Mirror File

A driver mirror file includes the content of the driver configuration file. The electronic device may open the driver mirror file in a virtual file system, thus the driver of the storage controller starts according to the driver mirror file while starting the virtual file system.

7. Driver Mapping File

A driver mapping file includes information of dependency relationship between modules of the operation system. The electronic device may open the driver mapping file in the root file system, thus the driver of the storage controller starts according to the driver mapping file while starting the root file system.

8. Drive Letter

A drive letter is an identifier of the storage medium to the operation system. While starting the operation system, the drive letters, such as "sda", "sdb", "sdc", and the like, are allocated according to a sequence of scanning the storage medium. The driver of the system disk storage controller and the driver of the data disk storage controller are run multi-threaded, which is difficult to determining a sequence of running the drivers. The driver of the data disk storage controller may firstly run, which cause the electronic device to scan the data disk and allocate a first drive letter (for example, "sda") to the data disk. However, for effectively distinguishing the drive letters of the system disk and the drive letters of the data disk, the electronic device considers the first drive letter as the drive letter of the system disk. While operations of writing or erasing to the data disk, if the first drive letter is the drive letter of data disk, the operations of writing or erasing may be wrongly applied to the drive letter of the system disk, which cause a data storage exception, even the operation system will be damaged.

Based on above, the present disclosure provides a method for managing the storage controllers, an electronic device, and a computer readable storage medium. The method comprises updating a driver configuration file of a data disk storage controller, updating a driver mirror file of a virtual file system according to the driver configuration file; rebooting an operation system of the electronic device; restarting a driver of a system disk storage controller according to the driver mirror file while starting the virtual file system; and restarting a driver of the data disk storage controller while starting a root file system.

The electronic device is described as follows.

FIG. 1 shows a first embodiment of an electronic device 100 of the present disclosure.

Referring to FIG. 1 the electronic device 100 may include a processor 110, a plurality of storage mediums 120, a system disk storage controller 130, and at least one data disk storage medium 140. The plurality of storage mediums 120 may include a system disk and at least one data disk. The system disk storage controller 130 and the at least one data disk storage medium 140 are electrically connected to the plurality of storage mediums 120 respectively. The processor 110 may execute computer programs or codes stored in the storage medium 120 to implement a method for managing storage controllers of the present disclosure.

The processor 110 may include one or more processing unit. For example. The processor 110 may include, but not being limited, an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate components or integrated in one or more processors.

The processor 110 also may also be provided with a memory for storing instructions and data. In some embodiments, the memory in the processor 110 is a cache memory. The memory can store instructions or data created or used or recycled by the processor 110. If the processor 110 needs to use the instructions or data again, it can be called up directly from the memory.

In some embodiments, the processor 110 may include one or more interfaces. The interface may include an integrated circuit (I2C) interface, an integrated circuit sound (I2S) interface, a pulse code modulation (PCM) interface, a universal asynchronous receiver/transmitter (UART) interface, and a mobile industry processor interface (MIPI), general purpose input/output (GPIO) interface, SIM interface, and/or USB interface, and the like.

It can be understood that the interface connection relationship between the modules illustrated in this embodiment is merely illustrative and does not constitute a structural limitation on the electronic device 100. In some other embodiments, the electronic device 100 may alternatively use an interface connection manner different than the foregoing embodiment, or a combination of multiple interface connection manners.

The storage medium 120 may include an external storage interface and an internal storage medium. The external storage interface may be configured to connect an external storage medium, for example, a micro SD card, to expand a storage capacity of the electronic device 100. The external storage medium communicates with the processor 110 by using the external memory interface to implement a data storage function. The internal storage medium may be configured to store computer-executable program codes, where the computer-executable program codes include instructions. The internal storage medium may include a program storage area (system disk) and a data storage area (data disk). The program storage area may store an operation system, an application program required by at least one function (for example, a sound play function or an image play function), and the like. The data storage area may store data (for example, audio data and address book) created during the use of the electronic device 100. In addition, the internal memory may include a high-speed random access memory and may further include a nonvolatile memory, for example, at least one magnetic disk storage device, a flash memory, or a universal flash storage (universal flash storage, UFS). The processor 110 runs the instruction stored in the internal memory and/or the instruction stored in the memory disposed in the processor 110, to perform various function applications of the electronic device 100 and data processing, for example, to implement the method of managing storage controllers of the present disclosure.

Figure 2:
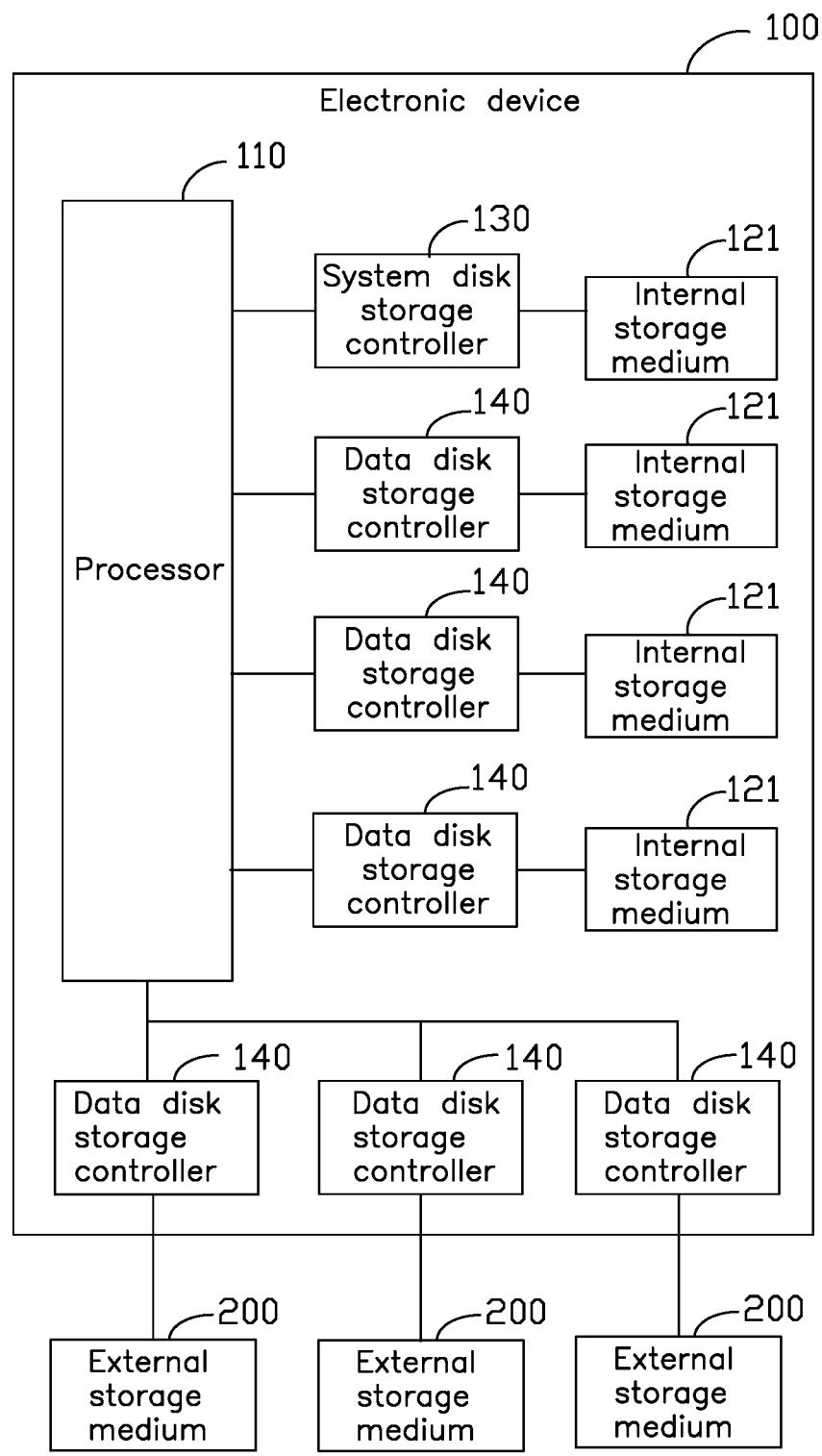
FIG. 2 is a diagram illustrating a second embodiment of an electronic device according to the present disclosure.

FIG. 2 shows a second embodiment of the electronic device 100.

Referring to FIG. 2, the electronic device 100 may include a processor 110, at least one internal storage medium 121, a system disk storage controller 130, and at least one data disk storage controller 140. When the electronic device 100 connects with an external storage medium 200, the processor 110 may run a computer program or code stored in the at least one internal storage medium 121 to implement the method for managing the storage controllers of the present disclosure.

In one embodiment, there are a plurality of internal storage mediums 121, which includes a system disk and at least one data disk. The system disk storage controller 130 and the at least one data disk storage controller 140 are electrically connected with the plurality of internal storage mediums 121 respectively. The external storage mediums 200 include other data disks besides the data disk in the internal storage medium 121. The storage controllers 140 corresponding to the other data disks are electrically connected with several external storage mediums 200 respectively.

In one embodiment, the internal storage medium 121 includes the system disk, and the system disk storage controller 130 is electrically connected with the internal storage medium 121. Each data disk storage controller 140 is electrically connected with a corresponding external storage medium 200.

In other embodiments, the external storage mediums 200 include the system disk and the at least one data disk. The system disk storage controller 130 and the at least data disk storage controller 140 are electrically connected with the external storage mediums 200 respectively.

It is understood that the structure shown in this embodiment of the present technology does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The electronic device 100 may include a smart phone, a tablet, a personal computer (PC), an e-book reader, a work station, a server, a personal digital assistant (PDA), a portable multimedia player (PMP), and the like, but not being limited.

A method for managing the storage controllers of the present disclosure will be described as flow.

Figure 3:
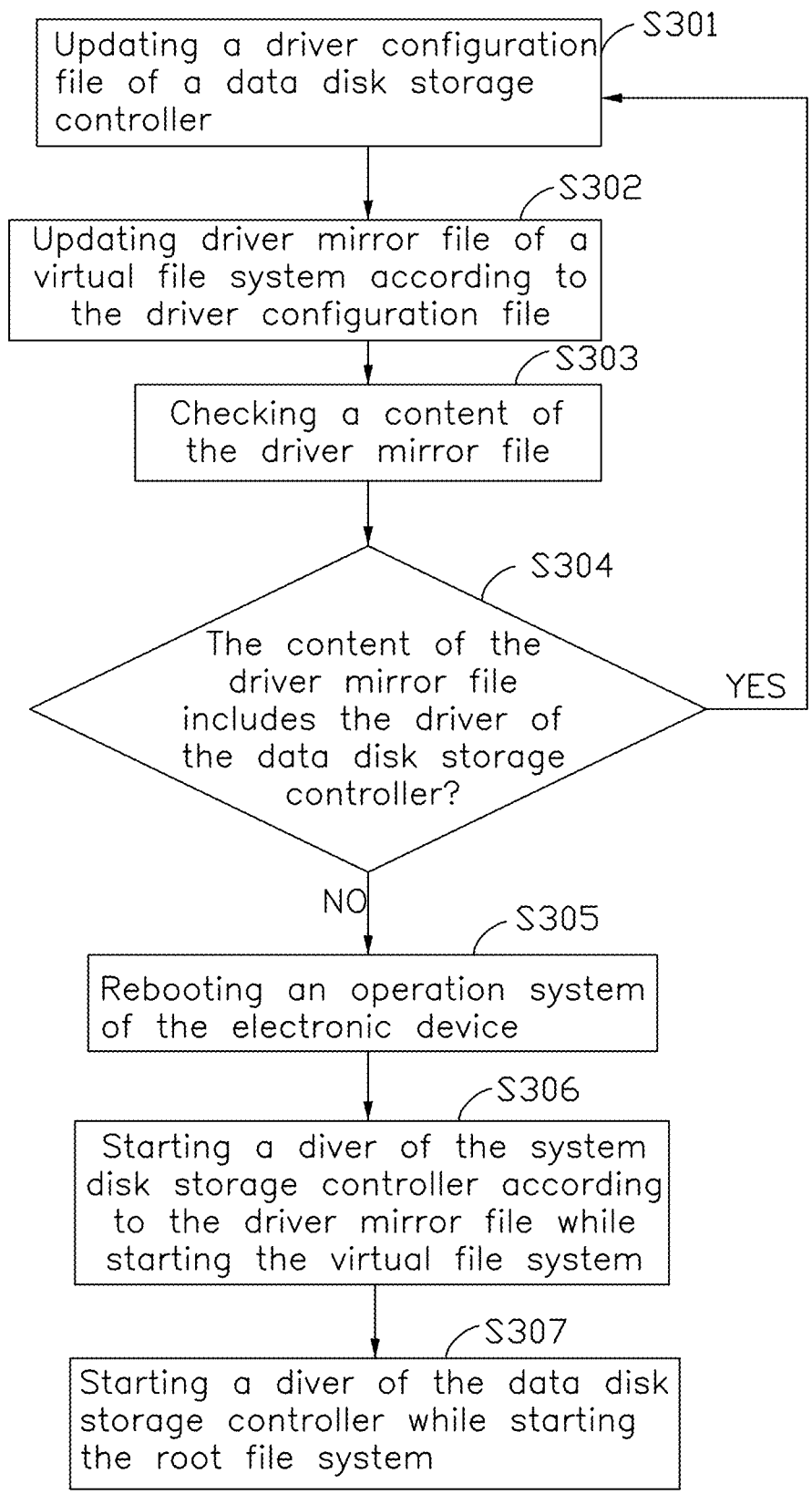
FIG. 3 is a flowchart illustrating an embodiment of a method for managing the storage controllers according to the present disclosure.

FIG. 3 shows a flowchart of the method for managing the storage controllers.

Referring to FIG. 3, the method for managing the storage controllers is used in the electronic device as shown in FIG. 1 or FIG. 2. The method may comprise at least the following steps, which also may be re-ordered.

In block S301, a driver configuration file of data disk storage controller 140 is updated.

In one embodiment, the electronic device 100 may recreate the driver configuration file of the data disk storage controller 140 and replace old driver configuration file of the data disk storage controller 140 by the recreated driver configuration file.

In some embodiments, the electronic device 100 may change content of the driver configuration files of the data disk storage controllers 140.

It is understood that the electronic device 100 adjusts a starting time of a driver of the data disk storage controllers 140 by updating the driver configuration files of the data disk storage controllers 140, thus content of a driver mirror file does not include the driver of the data disk storage controllers 140.

In block S302, a driver mirror file of a virtual file system is updated according to the driver configuration file.

In one embodiment, the electronic device 100 recreates the driver mirror file of the virtual file system by a "dracut" instruction and replaces the old driver mirror file by the recreated driver mirror file.

In some embodiments, the electronic device 100 may change the content of the driver mirror file according to the content of the driver configuration file.

In block S303, a content of the driver mirror file is checked.

In one embodiment, the electronic device 100 checks the content of the driver mirror file by "Isinitrd" instruction after the driver mirror file being updated.

In some embodiments, the electronic device 100 polls the content of the driver mirror file according to a driving identifier of the data disk storage controller 140 and determines whether the content of the driver mirror file includes the driver of the data disk storage controller 140.

It is understood that the driving identifier is configured to distinguish different drivers. The driving identifier may include a name or a serial number of the driver.

In block S304, determining whether the content of the driver mirror file includes the driver of the data disk storage controller 140.

In one embodiment, the electronic device 100 determines whether the operation of updating the driver mirror file is successful. When the operation of updating the driver mirror file is successful, the content of the driver mirror file does not include the driver of the data disk storage controller 140. When the operation of updating the driver mirror file is unsuccessful, the content of the driver mirror file includes the driver of the data disk storage controller 140.

When the content of the driver mirror file includes the driver of the data disk storage controller 140, the procedure returns to the block S301 for re-updating the driver mirror file, until the operation of updating the driver mirror file is successful. When the content of the driver mirror file does not include the driver of the data disk storage controller 140, the procedure goes to block S305.

In block S305, an operation system of the electronic device 100 is rebooted.

In one embodiment, the electronic device 100 reboots the operation system by "reboot" instruction.

In some embodiments, the electronic device 100 reboots the operation system in response to a reboot instruction.

It is understood that a display screen of the electronic device 100 shows a reboot control while the content of the driver mirror file does not include the driver of the data disk storage controller 140. If the reboot control is trigged, the reboot instruction is generated, the electronic device 100 reboots the operation system in response to the reboot instruction. The reboot control may be triggered by users, for example the reboot control is clicked or touched by users. The reboot control may set a wait time. While a time duration of operating the reboot control exceeding the wait time, the operation system triggers the reboot control for generating the reboot instruction.

In block S306, a diver of the system disk storage controller 130 is started according to the driver mirror file while starting the virtual file system.

It is understood that the operations of rebooting the operation system by the electronic device 100 includes a stage of starting the virtual file system and a stage of starting the root file system. The root file system is started after the virtual file system being started.

In one embodiment, the content of the driver mirror file merely includes the driver of the system disk storage controller 130, the electronic device 100 starts the driver of the system disk storage controller 130 according to the driver mirror file while the stage of starting the virtual file system, thus the first drive letter is allocated to the system disk.

In block S307, the driver of the data disk storage controller 140 is started while starting the root file system.

In one embodiment, after the virtual file system being started, the electronic device 100 starts the driver of the data disk storage controller 140 while the stage of starting the root file system, thus other drive letters besides the first drive letter are orderly allocated to the data disks.

It is understood that while the root file system being completely loaded, the operation system loads other file systems. The loading operation is a process of reading information by a memory of the electronic device 100 according to the root file system. After rebooting the operation system, the electronic device 100 may access a corresponding storage medium based on the system disk storage controller 130 or the data disk storage controller 140.

Figure 4:
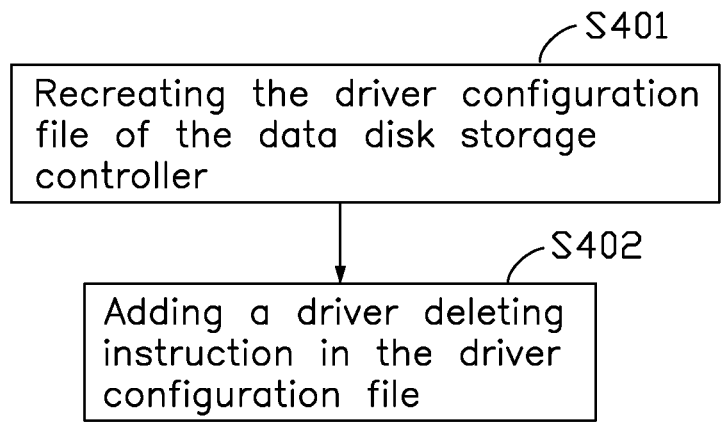
FIG. 4 is a detail flowchart illustrating a first embodiment of the block S301 of the flowchart in FIG. 3 according to the present disclosure.

FIG. 4 shows a first embodiment of a detail flowchart of the block S301. The block S301 further includes the following steps.

In block S401, the driver configuration file of the data disk storage controller 140 is recreated.

In one embodiment, before updating the driver mirror file of the virtual file system, the electronic device 100 recreates the driver configuration file under a path of the driver mirror file.

For example, the path of the driver mirror file for recreating the driver configuration file of the data disk storage controller 140, which is named as "smartpqi", is shown as below.

/etc/dracut.conf.d/smartpqi.conf

In block S402, a driver deleting instruction is added in the driver configuration file.

The driver deleting instruction is configured to delete the driver of the data disk storage controller 140.

In one embodiment, the electronic device 100 deletes the driver of the data disk storage controller 140 by "omit drivers" instruction.

For example, the instruction for deleting the driver named of "smartpqi" by the electronic device 100 is shown as follow.

omit drivers+="smartpqi"

It is understood that the electronic device 100 deletes the driver of the data disk storage controller 140 by updating the driver configuration file of the data disk storage controller 140, a starting time of the driver of the data disk storage controller 140 is adjusted to the stage of starting the root file system, thus the driver of the system disk storage controller 130 is firstly started while the stage of starting the virtual file system for allocating a first drive letter to the system disk.

Figure 5:
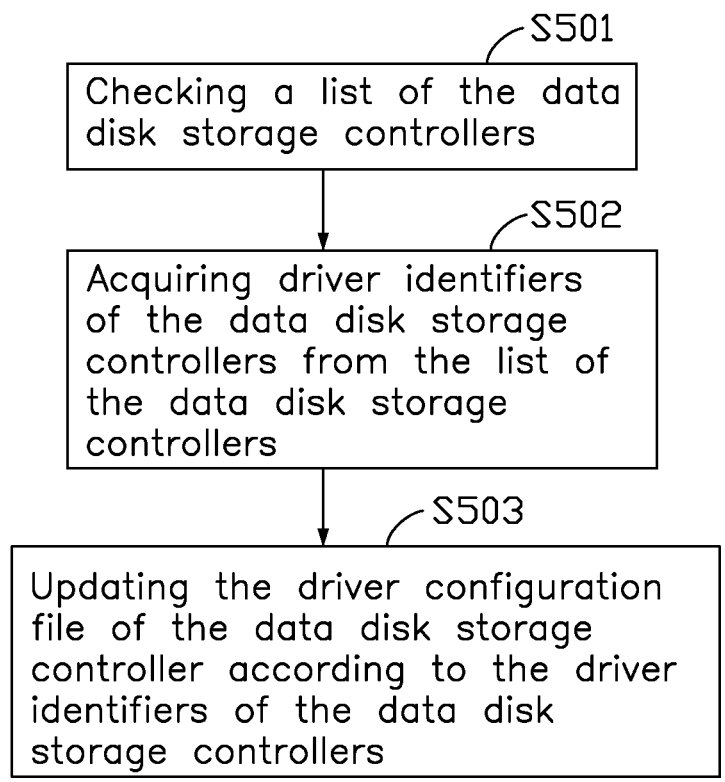
FIG. 5 is a detail flowchart illustrating a second embodiment of the block S301 of the flowchart in FIG. 3 according to the present disclosure.
Figure 6:
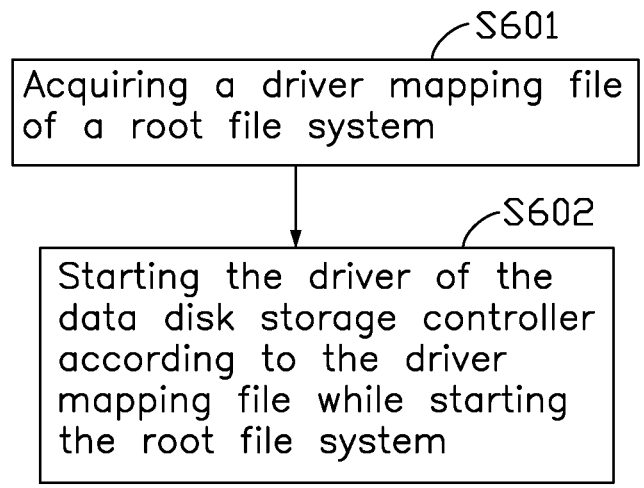
FIG. 6 is a detail flowchart illustrating an embodiment of the block S307 of the flowchart in FIG. 3 according to the present disclosure.

FIG. 5 shows a second embodiment of a detail flowchart of the block S301. The block S301 further includes the following steps.

In block S501, a list of the data disk storage controllers 140 is checked.

The list of the data disk storage controllers is configured to store related information of at least one data disk storage controller 140, such as driver identifiers of the at least one data disk storage controller 140.

In one embodiment, the electronic device checks the list of the data disk storage controllers 140 of a small computer system interface (SCSI) by "lsscsi" instruction.

In block S502, driver identifiers of the data disk storage controllers 140 are acquired from the list of the data disk storage controllers 140.

For example, the electronic device 100 invokes the driver identifiers of the data disk storage controllers 140, such as the driver "mpt3sas" for a HBA card or the driver "megaraid sas" for RAID card, from the list of the data disk storage controllers 140.

In block S503, the driver configuration file of the data disk storage controller 140 is updated according to the driver identifiers of the data disk storage controllers 140.

In one embodiment, the electronic device 100 recreates the driver configuration file of the data disk storage controller 140 based on the driver identifier of the data disk storage controller 140.

FIG. 0.6 shows a detail flowchart of the block S307. The block S307 further includes the following steps.

In block S601, a driver mapping file of a root file system is acquired.

In one embodiment, the electronic device 100 recreates the driver mapping file of the root file system by "depmod" instruction.

In block S602, the driver of the data disk storage controller 140 is started according to the driver mapping file while starting the root file system.

In one embodiment, after the virtual file system being started, the electronic device 100 starts the driver of the data disk storage controller 140 according to the driver mapping file in the stage of starting the root file system, thus the drive letters beside the first drive letter are orderly allocated to the data disks.

The present discloses also provides a computer readable storage medium. The computer readable storage medium stores computer programs or codes, when being executed to perform the foregoing method for managing the storage controllers.

The computer storage medium includes volatile and non-volatile, removable and non-removable media implemented in any method or technology for storing information such as computer readable instructions, data structures, program modules or other data. The computer storage medium includes, but is not being limited, Random Access Memory (RAM), Read-Only Memory (ROM), Electrically Erasable Programmable Read-Only Memory (EEPROM), flash memory or other memory technologies, Compact Disc Read-Only Memory (CD-ROM), digital versatile disks (DVD) or other optical disk storages, magnetic cassettes, magnetic tapes, magnetic disk storages or other magnetic storage devices or any other media that may be used to store desired information and may be accessed by a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing storage controllers, being applicable in an electronic device; the electronic device comprises a storage medium with computer programs and a processor; the processor executes the computer programs to implement following processes:
    updating a driver configuration file of a data disk storage controller of a data disk; wherein the content of the original driver configuration file comprises a driver of the data disk storage controller and a driver of a system disk storage controller; the updated driver configuration file excludes the driver of the data disk storage controller;
    updating a driver mirror file of a virtual file system according to the updated driver configuration file using a "dracut" instruction; wherein the updated driver mirror file comprises the content of the updated driver configuration file; the update driver mirror file comprise the driver of the system disk storage controller and excludes the driver of the data disk storage controller;
    rebooting an operation system of the electronic device;
    starting the driver of a system disk storage controller of a system disk according to the driver mirror file while starting the virtual file system based on the updated driver mirror file to allocate a first driver letter to the system disk; and
    starting a driver of the data disk storage controller while starting a root file system.

2. The method of claim 1, wherein the method further comprises:
    checking a content of the driver mirror file;
    determining whether the content of the driver mirror file comprises the driver of the data disk storage controller; and
    rebooting the operation system of the electronic device if the content of the driver mirror file does not comprise the driver of the data disk storage controller.

3. The method of claim 2, wherein the method further comprises:
    updating the driver configuration file of the data disk storage controller if the content of the driver image comprises the driver of the data disk storage controller.

4. The method of claim 1, wherein updating the driver configuration file of the data disk storage controller comprises:
    recreating the driver configuration file of the data disk storage controller; and
    adding a driver deleting instruction in the driver configuration file;
    wherein the driver deleting instruction is configured to delete the driver of the data disk storage controller.

5. The method of claim 1, wherein updating the driver configuration file of the data disk storage controller comprises:
    checking a list of the data disk storage controllers;
    acquiring driver identifiers of the data disk storage controllers from the list of the data disk storage controllers; and
    updating the driver configuration file of the data disk storage controller according to the driver identifiers of the data disk storage controllers.

6. The method of claim 5, wherein updating the driver configuration file of the data disk storage controller according to the driver identifiers of the data disk storage controllers further comprises:
    recreating the driver configuration file of the data disk storage controller based on the driver identifiers of the data disk storage controllers.

7. The method of claim 1, wherein starting the driver of the data disk storage controller while starting the root file system further comprises:
    acquiring a driver mapping file of the root file system; and
    starting the driver of the data disk storage controller according to the driver mapping file while starting the root file system.

8. An electronic device comprises:
    an internal storage medium;
    a data storage controller;
    at least one data disk storage controller; and
    a processor,
    wherein the internal storage medium stores computer programs, and
    the processor executes the computer programs to implement the following processes when the electronic device connects with an external storage medium:
        updating a driver configuration file of the data disk storage controller of a data disk; wherein the content of the original driver configuration file comprises a driver of the data disk storage controller and a driver of a system disk storage controller; the updated driver configuration file excludes the driver of the data disk storage controller;
        updating a driver mirror file of a virtual file system according to the updated driver configuration file using a "dracut" instruction; wherein the updated driver mirror file comprises the content of the updated driver configuration file; the update driver mirror file comprise the driver of the system disk storage controller and excludes the driver of the data disk storage controller;
        rebooting an operation system of the electronic device;
        starting a driver of the system disk storage controller of a system disk according to the driver mirror file while starting the virtual file system based on the updated driver mirror file to allocate a first driver letter to the system disk; and
        starting a driver of the data disk storage controller while starting a root file system.

9. The electronic device of claim 8, wherein the processor further:
    checking a content of the driver mirror file;
    determining whether the content of the driver mirror file comprises the driver of the data disk storage controller;
    rebooting the operation system of the electronic device if the content of the driver mirror file does not comprises the driver of the data disk storage controller; and updating the driver configuration file of the data disk storage controller if the content of the driver image comprises the driver of the data disk storage controller.

10. The electronic device of claim 9, wherein the processor further:
recreating the driver configuration file of the data disk storage controller; and
adding a driver deleting instruction in the driver configuration file;
wherein the driver deleting instruction is configured to delete the driver of the data disk storage controller.

11. The electronic device of claim 8, wherein updating the driver configuration file of the data disk storage controller comprises:
checking a list of the data disk storage controllers;
acquiring driver identifiers of the data disk storage controllers from the list of the data disk storage controllers; and
updating the driver configuration file of the data disk storage controller according to the driver identifiers of the data disk storage controllers.

12. The electronic device of claim 9, wherein updating the driver configuration file of the data disk storage controller comprises:
updating the driver configuration file of the data disk storage controller if the content of the driver image comprises the driver of the data disk storage controller.

13. The electronic device of claim 12, wherein updating the driver configuration file of the data disk storage controller according to the driver identifiers of the data disk storage controllers further comprises:
recreating the driver configuration file of the data disk storage controller based on the driver identifier of the data disk storage controller.

14. An electronic device comprises:
a plurality of storage mediums;
a data storage controller;
at least one data disk storage controller; and
a processor,
wherein the plurality of the storage medium stores computer programs, and
the processor executes the computer programs to implement the following processes:
updating a driver configuration file of the data disk storage controller of a data disk; wherein the content of the original driver configuration file comprises a driver of the data disk storage controller and a driver of a system disk storage controller; the updated driver configuration file excludes the driver of the data disk storage controller;
updating a driver mirror file of a virtual file system according to the updated driver configuration file using a "dracut" instruction; wherein the updated driver mirror file comprises the content of the updated driver configuration file; the update driver mirror file comprise the driver of the system disk storage controller and excludes the driver of the data disk storage controller;
rebooting an operation system of the electronic device;
starting the driver of the system disk storage controller of a system disk according to the driver mirror file while starting the virtual file system based on the updated driver mirror file to allocate a first driver letter to the system disk; and
starting a driver of the data disk storage controller while starting a root file system.

15. A non-transitory computer readable storage medium, the non-transitory computer readable storage medium stores computer programs, and the computer programs are executed by at least one processor to implement following steps:
updating a driver configuration file of a data disk storage controller of a data disk; wherein the content of the original driver configuration file comprises a driver of the data disk storage controller and a driver of a system disk storage controller; the updated driver configuration file excludes the driver of the data disk storage controller;
updating a driver mirror file of a virtual file system according to the updated driver configuration file using a "dracut" instruction; wherein the updated driver mirror file comprises the content of the updated driver configuration file; the update driver mirror file comprise the driver of the system disk storage controller and excludes the driver of the data disk storage controller;
rebooting an operation system of the electronic device;
starting the driver of a system disk storage controller of a system disk according to the driver mirror file while starting the virtual file system based on the updated driver mirror file to allocate a first driver letter to the system disk; and
starting a driver of the data disk storage controller while starting a root file system.

16. The non-transitory computer readable storage medium of claim 15, wherein the processor further:
checking a content of the driver mirror file;
determining whether the content of the driver mirror file comprises the driver of the data disk storage controller;
rebooting the operation system of the electronic device if the content of the driver mirror file does not comprises the driver of the data disk storage controller; and
updating the driver configuration file of a data disk storage controller if the content of the driver image comprises the driver of the data disk storage controller.

17. The non-transitory computer readable storage medium of claim 15, wherein updating the driver configuration file of the data disk storage controller comprises:
recreating the driver configuration file of the data disk storage controller; and
adding a driver deleting instruction in the driver configuration file;
wherein the driver deleting instruction is configured to delete the driver of the data disk storage controller.

18. The non-transitory computer readable storage medium of claim 15, wherein updating the driver configuration file of the data disk storage controller comprises:
checking a list of the data disk storage controllers;
acquiring driver identifiers of the data disk storage controllers from the list of the data disk storage controllers; and
updating the driver configuration file of the data disk storage controller according to the driver identifiers of the data disk storage controllers.

19. The non-transitory computer readable storage medium of claim 18, wherein updating the driver configuration file of the data disk storage controller according to the driver identifiers of the data disk storage controllers further comprises:
recreating the driver configuration file of the data disk storage controller based on the driver identifiers of the data disk storage controllers.

20. The non-transitory computer readable storage medium of claim 15, wherein the starting the driver of the data disk storage controller while starting a root file system comprises:
  acquiring a driver mapping file of a root file system; and
  starting the driver of the data disk storage controller according to the driver mapping file while starting the root file system.

* * * * *